(12) United States Patent
Amato

(10) Patent No.: US 6,619,238 B1
(45) Date of Patent: Sep. 16, 2003

(54) ANIMAL LEASH SYSTEM

(76) Inventor: Anthony T. Amato, 83 Canal St., New York City, NY (US) 10002

( * ) Notice: Subject to any disclaimer, the term of this patent is extended or adjusted under 35 U.S.C. 154(b) by 0 days.

(21) Appl. No.: 10/032,545

(22) Filed: Jan. 2, 2002

(51) Int. Cl.$^7$ .............................................. A01K 27/00
(52) U.S. Cl. ........................ 119/795; 119/797; 119/792
(58) Field of Search ................................ 119/795, 797, 119/793, 792, 770; 24/302, 301, 115 H, 129 R, 129 B

(56) References Cited

U.S. PATENT DOCUMENTS

| | | | | |
|---|---|---|---|---|
| 2,013,061 A | * | 9/1935 | Loewinsohn | 24/49.1 |
| 2,520,325 A | * | 8/1950 | Moore | 403/209 |
| 4,879,972 A | * | 11/1989 | Crowe et al. | 119/792 |
| 4,974,549 A | * | 12/1990 | Gordon | 119/793 |
| 5,483,925 A | * | 1/1996 | Childress | 119/795 |
| 5,551,379 A | * | 9/1996 | Hart | 119/771 |
| 5,701,848 A | * | 12/1997 | Tozawa | 119/795 |
| 5,718,190 A | * | 2/1998 | Tinker | 119/771 |
| 5,735,234 A | * | 4/1998 | May | 119/795 |
| 5,852,988 A | * | 12/1998 | Gish | 119/795 |
| 5,934,224 A | * | 8/1999 | Sporn | 119/792 |
| 6,055,941 A | * | 5/2000 | Welsh | 119/795 |
| 6,237,539 B1 | * | 5/2001 | Sporn | 119/771 |

* cited by examiner

*Primary Examiner*—Charles T. Jordan
*Assistant Examiner*—John W. Zerr
(74) *Attorney, Agent, or Firm*—Alfred F. Hoyte, Jr.

(57) ABSTRACT

An animal leash system includes at least two ropes which can serve as leads. One of the ropes is relatively short and is used as a heeling lead. A plurality of rope clamps are adapted for friction fit about the ropes to facilitate binding of end portions of the rope allowing for various leash configurations. The clamps also facilitate coupling of the ropes to produce a double lead arrangement. A slip ring allows for use without a collar in one configuration of the leash system, while a clip secured to an end portion of the leash allows for attachment to a typical collar in another configuration. The proximal end of the leash may be formed into a handle to allow a user to hold the leash.

4 Claims, 6 Drawing Sheets

ANIMAL LEASH SYSTEM

BACKGROUND OF THE INVENTION

This invention relates generally to animal leashes. More specifically, the invention relates to an animal leash system having interchangeable components which allows for different arrangements to accommodate various situations.

STATEMENT OF THE PRIOR ART

Animal restraints and dog leashes which are configured for specific situations are well known. For example, crates may be used for travel and short term restraint for over active dogs. Variable length leashes are typically retractably spooled to allow a user to control the length of the leash depending, e.g., upon the dog's proximity to oncoming traffic.

A typical dog leash includes a collar having a metal loop or ring to which a lead, usually made of leather, may be removably attached. Some leashes provide adjustable length leads which may be adjusted by the way of a series of "waist holes" allowing a varying overlap of the leash material. While having the capability for length adjustment makes the leash more versatile, it does not address certain specific situations which may occur when walking or recreating a dog or other leashed pet. For example, it is often necessary to keep the dog's head and mouth away from passers-by or small children. This is typically accomplished by grabbing under the coilar. While this method may be satisfactory for small animals, it can lead to sprained or broken fingers when attempted with a larger, more powerful animal. Also, when hunting, it may be necessary to restrain an animal to a tree or other object, the size of which is totally unpredictable.

U.S. Pat. No. 5,842,444 issued to Joseph T Perrulli discloses a hands free dog leash system which includes a belt or harness adapted for wearing about the torso of a person. By contrast, the present invention contemplates a leash system having a number of different applications, including use as a hands free leash.

U.S. Pat. No. 5,551,380 issued to Sarah Hodgson discloses another hands free adjustable leash system. The system allows for adjustable attachment to a user at one end, with attachment means for attaching to a collar at the other end. By contrast, the present invention allows for hands free use, use with or without a collar, use as a short range restraint (e.g., for heeling), as well as other uses.

SUMMARY OF THE INVENTION

The present invention provides a versatile animal leash system. The system includes at least two ropes which can serve as leads. A plurality of rope clamps are adapted for friction fit about the ropes to facilitate binding of end portions of the rope allowing for various leash configurations. The clamps also facilitate coupling of the ropes to produce a double lead arrangement. A slip ring allows for use without a collar in one configuration of the leash system, while a clip secured to an end portion of the leash allows for attachment to a typical collar in another configuration. A first one of the ropes is relatively short and is used as a heeling lead. The proximal end of the leash may be formed into a handle to facilitate one handed control of the leashed animal. Alternatively, the proximal end of the leash, by adjusting the position of one of the clamps, may be used for attachment to an immovable object such as tree. Multiple heeling leads may be attached to a single main lead to allow a single user to leash several dogs at once.

Accordingly, it is a principal object of the invention to provide an animal leash system which may be configured for several different applications.

It is another object of the invention to provide an animal leash system which includes a dual purpose clamping means which allows for rapid and easy reconfiguration of the leash.

It is another object of the invention to provide an animal leash system which uses rope instead of leather straps as the lead material.

It is another object of the invention to provide an animal leash system which may be secured in the field to immovable objects of varying size.

It is another object of the invention to provide an animal leash system which allows a single user to leash several animals at once.

It is another object of the invention to provide an animal leash system which may configured for hand free use.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
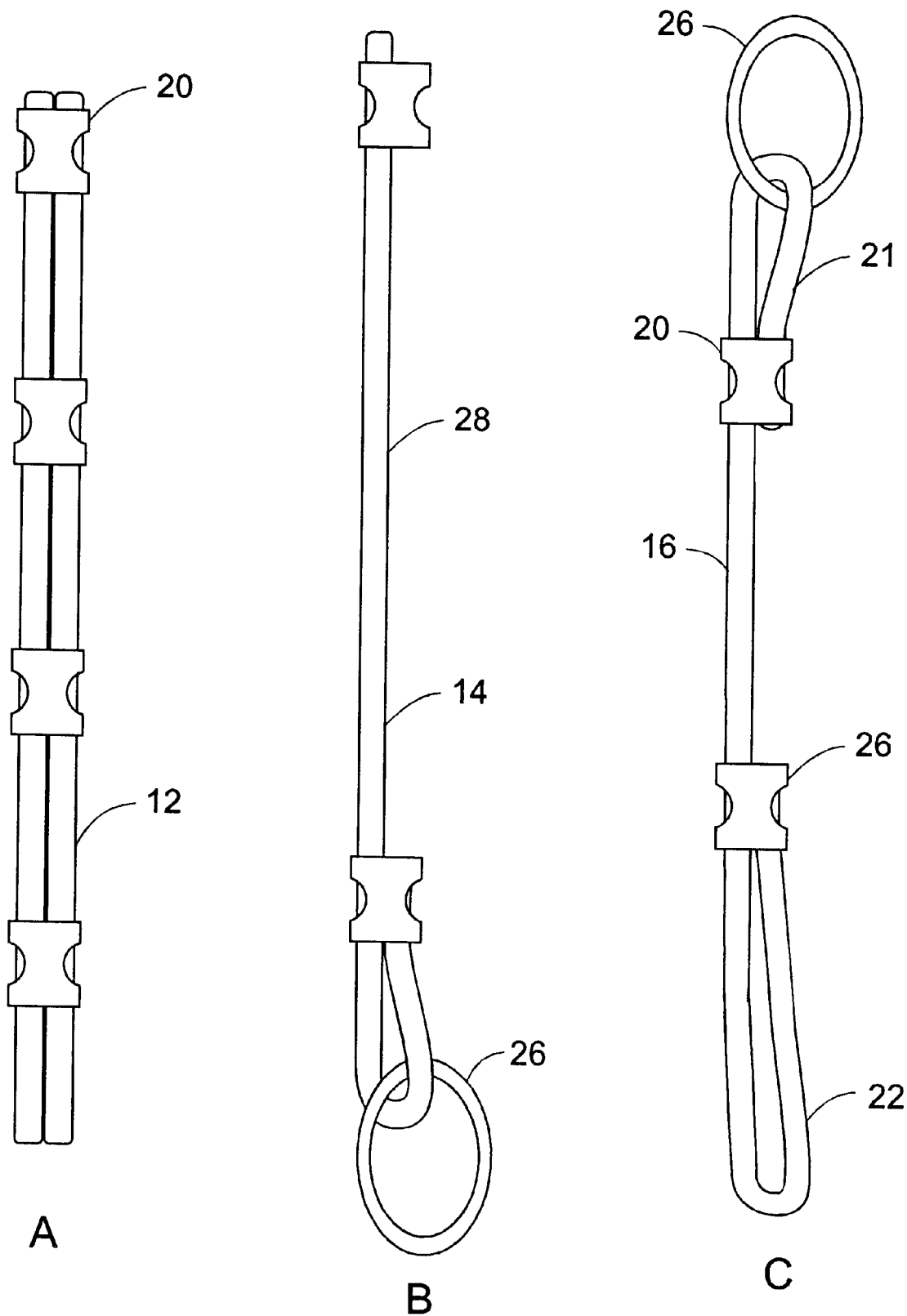
FIGS. 1A–1C show a plan view of three of the leads that can be used with the leash system of the invention.
Figure 4:
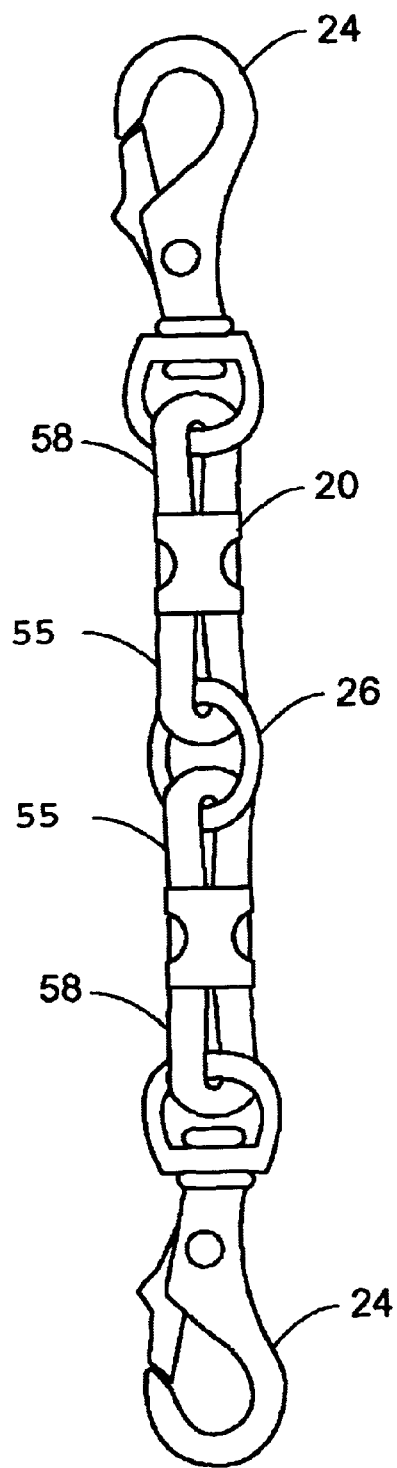
FIG. 4 shows a plan view of 2 heeling leads connected to allow one user to leash two animals.
Figure 5:
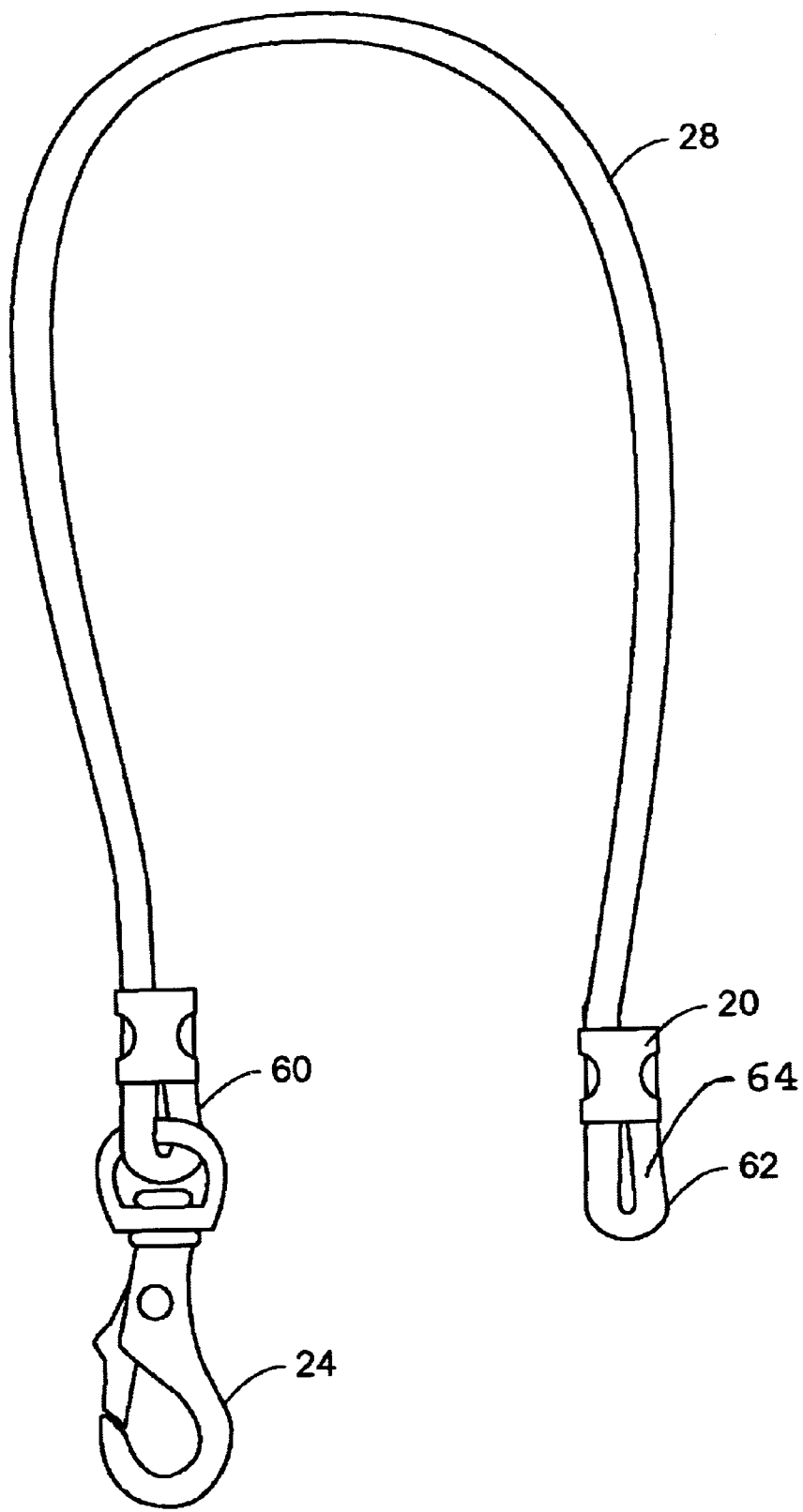
FIG. 5 shows a plan view of a leash adapted for hands free operation.
Figure 6:
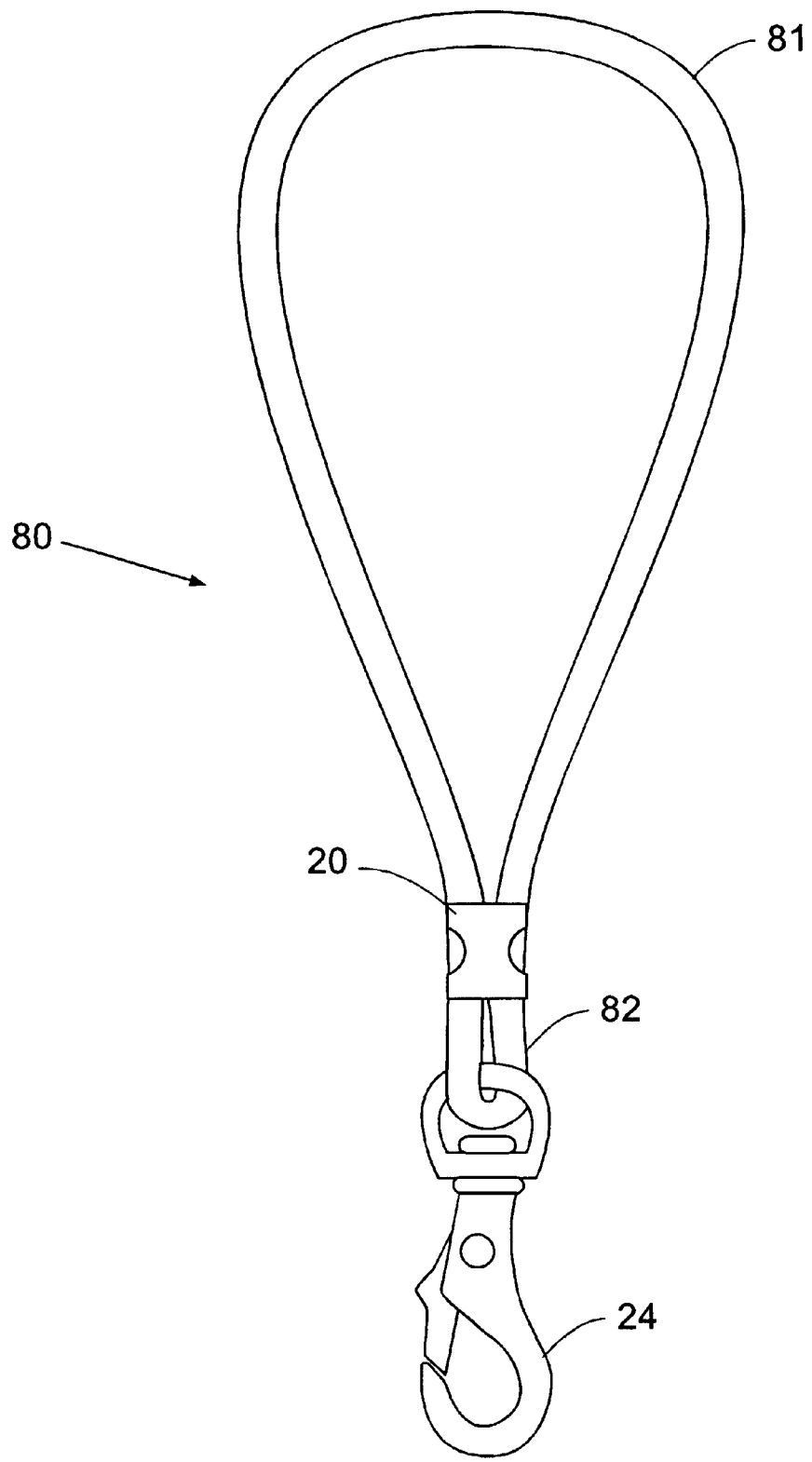
FIG. 6 shows a plan view of an alternative embodiment for a heeling lead.

Referring now to FIGS. 1–6, the various configurations and components of the leash system of the present invention; generally designated by the numeral 10, are shown. FIG. 1 shows the basic lead configuration which may range in length from 2 to 8 feet or longer. The basic lead may be a double lead 12, as shown in FIG. 1A, or a single lead 14, as shown in FIG. 1B. A heeling lead 16, shown in FIG. 1C, is the shortest of the basic leads and is advantageously used to heel a dog or hold an animal at close range. An alternative heeling lead is shown in FIG. 6. It should be noted that while the invention is described particularly in reference to it's use as a dog leash system, it may also be used to leash any type of animal which is customarily leashed. Regardless of the type of lead, 12, 14, or 16, with the exception of the heeling lead shown in FIG. 6, at least two rope clamps 20 are used. Referring specifically to FIG. 1C, The clamp 20 closest to the proximate end, i.e., the end held by the user, serves to allow overlap of the lead for the purpose of forming a handle 22. The clamp 20 at the distal end, forms a loop 21 through which a collar clip 24 or slip ring 26 may be inserted. It can be seen in FIG. 1A that a plurality of clamps 20 are employed for the double lead 12. The additional middle clamps 20 serve to maintain each of the leads in mutually parallel relation. In accordance with one aspect of the invention, the clamps 20 should be spaced at about 2 foot intervals when used with the double lead configuration.

It should be noted that, in accordance with another aspect of the invention, the rope 28 used for the leads is preferably Marine Boat Rope. Marine boat rope has superior durability when exposed to the elements, particularly rain, and can even be used underwater for long periods of time. It is also available in many colors, allowing the user a wide variety of choices to accommodate aesthetic requirements.

Figure 2:
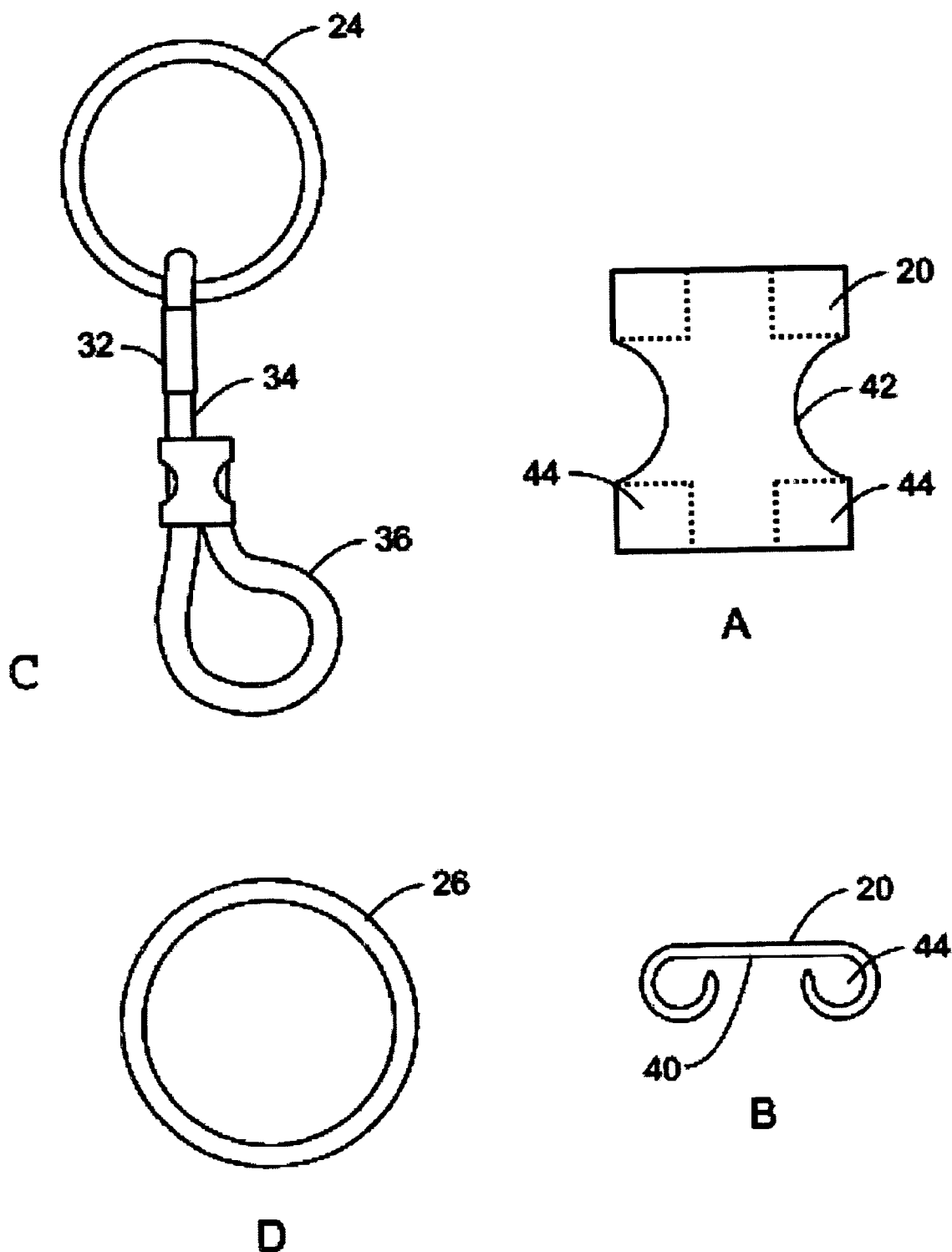
FIG. 2A shows a plan view of one of the types of connectors used to assemble the various leashes of the invention.
FIG. 2B shows a side view of the connector shown in FIG. 2A.
FIG. 2C show a plan view of another connector used with the leash system of the present invention.
FIG. 2D shows a plan view of a slip ring used with the lease system of the invention

With particular reference to FIG. 2, the discrete components of the system are shown in detail. Clamp 20 serves as the primary facilitator of the system. As has been previously mentioned, the clamp 20 serves to form the end portions of the rope into either a handle 22, or a loop 21. While collar clip 24 is primarily used for attachment to an animal's collar, the slip ring 26 serves to facilitate various configurations of the leash system 10 as will be explained in more detail later. The collar clip 24 is a standard spring loaded normally closed clip. Movement of the clip mechanism from the closed to the open position is effected by sliding knob 32 downwards (axially with respect to the spring) thereby compressing the spring 34 and withdrawing piston 36.

The clamp 20 has a substantially planar main body 40 having opposing arcuate indentations 42. Opposing pairs of C-shaped channels 44 are disposed on opposing ends of the clamp main body 40 and are adapted for non-slip frictional fit about a rope or cord having a substantially circular cross-section. In the preferred embodiment, the clamps 20, clips 24, and slip rings 26 are preferably made of bronze, stainless steel, or other durable, weatherproof material.

Figure 3:
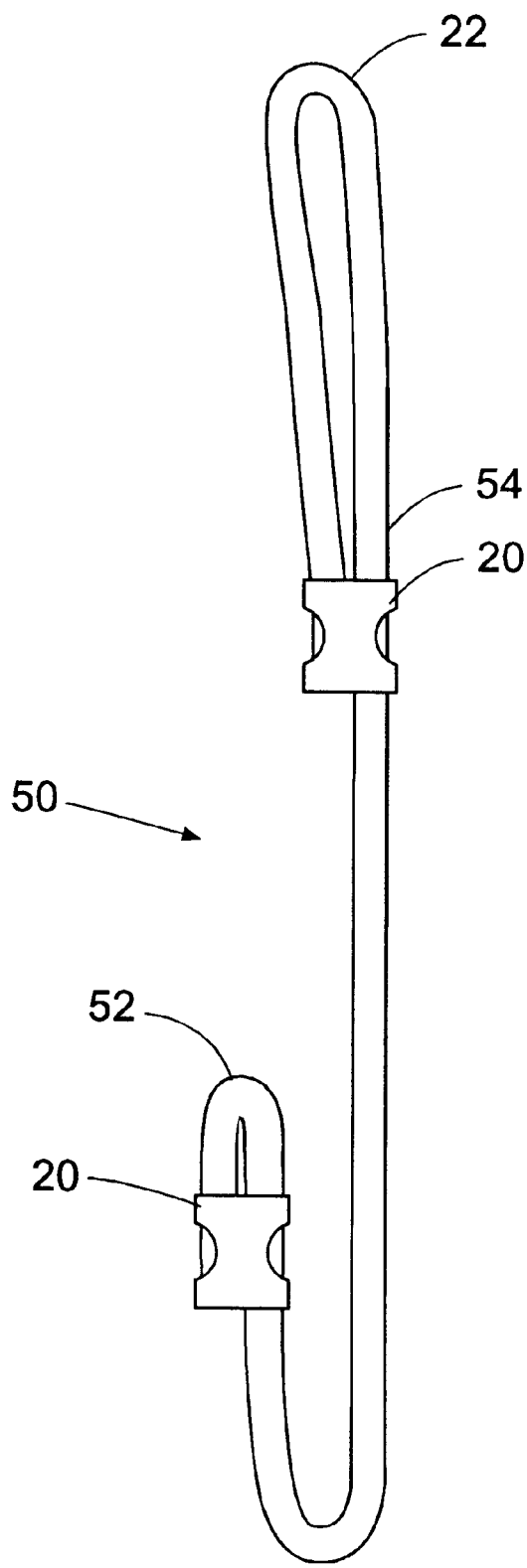
FIG. 3 shows a plan view of a leash adapted for use without a collar.

Referring now to FIGS. 3–6, various configurations possible with the system 10 of the invention are shown. FIG. 3, illustrates a "no collar" configuration 50. One end 52 of the rope 28 is inserted through the slip ring 26 and then secured thereabout by clamp 20. The other end 54 of the rope 28 is then passed through the slip ring 26. An additional clamp 20 is then used to form a handle 22. FIG. 4 shows an arrangement useful for simultaneously leashing multiple animals. A pair of ropes 55 are each formed into loop pairs by centrally positioned clamps 20. One side of each clamp 20 retains end portions of a rope 55 while the other side of the clamp 20 is centrally positioned to ensure that the end portions of each rope 55 terminates precisely at the clamp 20 to form equal sized loops. Clips 24 are attached to ends 58, while a common slip ring 26, secured at ends 56 serves to connect the rope pair 55. Any of the standard leads 12, 14, or 16 may then be attached to ring 26 using a clip 24. The clips 24 attached to the ends 58 of the rope pair 55 may then be attached to animal collars (not shown). Of course, more than two ropes 55 may be added to the arrangement, and a slightly larger slip ring 26 may be required in order to accommodate the additional ropes 55. FIG. 5 shows an adjustable leashing arrangement designed to leash an animal to virtually any size tree, post, or other suitable anchor. A clip 24 is provided at one end 60 of the rope 28 employing the previously described method using a clamp 20. A clamp 20 is also employed at the opposing end 62 to create a loop 64 of sufficient size to fit around, e.g., the base of a tree or other suitable anchor. This eliminates the need to screw an anchor into a tree trunk or drive a stake into the ground for anchoring purposes. Also, the same arrangement may be used for hands free walking, the user can facilitate this option by forming the loop 64 about his/her torso.

FIG. 6 shows a plan view of a heeling lead 80 employing only a single clamp 20. The lead 80 is formed by creating a single handle sized loop 81 from a single strand of rope. One end of the rope is inserted into one side of the clamp 20, the handle 81 is then formed by capturing an end portion of the rope in the other side of the clamp 20 leaving sufficient space to form a loop 82 to secure a clip 24.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. An animal restraint system allowing a single individual to leash and control at least two animals comprising:

at least first and second relatively short leads;

two clamp means, each of said clamp means having a substantially rectangular main body having arcuate indentations formed therein, pairs of opposing channels sized for frictional fit about a portion of said leads;

a slip ring;

two attachment clips;

said first lead formed into a first loop by attaching a first one of said clamps approximately centrally thereof, said second lead formed into a second loop by attaching a second one of said clamps approximately centrally thereof, respective end portions of said first and second loops mutually attached by said slip ring and respective opposing end portions of said first and second loops attached to respective ones of said attachment clips; and, a third relatively long lead attached to said slip ring via a third attachment clip at one end and having a handle portion at an opposing end.

2. The system of claim 1 wherein said leads are made of rope.

3. The system of claim 1 wherein multiple loops are mutually attached by said slip ring.

4. An animal restraint system comprising:

at least three leads, said at least three leads including at least two relatively short leads and one relatively long lead;

at least six clamp means, said clamp means having pairs of opposing channels sized for frictional fit about a portion of said leads, each of said channels having an arcuate indentation formed therein;

at least two slip rings;

at least three attachment clips adapted for attachment to a collar;

each of said short leads having one of said clips attached at a distal end, a pair of clamp means secured proximate opposing proximal ends, and wherein one of said slip rings may be attached to proximal ends of each of said short leads to effect mutual joining thereof;

wherein one of said short leads is formed into a heeling lead, said heeling lead including a handle portion terminating at one of said clamps wherein a loop is formed, and a clip is a attached to said loop.

* * * * *